United States Patent
Tokunaga et al.

(10) Patent No.: US 10,730,786 B2
(45) Date of Patent: Aug. 4, 2020

(54) ALKALI-FREE GLASS AND METHOD FOR PRODUCING THE SAME

(71) Applicant: AGC INC., Chiyoda-ku (JP)

(72) Inventors: Hirofumi Tokunaga, Tokyo (JP); Kazutaka Ono, Tokyo (JP); Motoyuki Hirose, Tokyo (JP)

(73) Assignee: AGC INC., Chiyoda-ku (JP)

( * ) Notice: Subject to any disclaimer, the term of this patent is extended or adjusted under 35 U.S.C. 154(b) by 0 days.

(21) Appl. No.: 16/392,714

(22) Filed: Apr. 24, 2019

(65) Prior Publication Data

US 2019/0248697 A1 Aug. 15, 2019

Related U.S. Application Data

(63) Continuation of application No. PCT/JP2017/039038, filed on Oct. 30, 2017.

(30) Foreign Application Priority Data

Nov. 2, 2016 (JP) ................................ 2016-214840

(51) Int. Cl.
C03C 3/087 (2006.01)
C03C 3/091 (2006.01)
C03B 5/18 (2006.01)

(52) U.S. Cl.
CPC ................ C03C 3/091 (2013.01); C03B 5/18 (2013.01); C03C 3/087 (2013.01); C03C 2203/10 (2013.01)

(58) Field of Classification Search
CPC .................................. C03C 3/091; C03C 3/087
See application file for complete search history.

(56) References Cited

U.S. PATENT DOCUMENTS

| | | |
|---|---|---|
| 2007/0191207 A1 | 8/2007 | Danielson et al. |
| 2008/0127679 A1 | 6/2008 | Nishizawa et al. |
| 2011/0048074 A1 | 3/2011 | Danielson et al. |
| 2012/0282450 A1 | 11/2012 | Kawaguchi et al. |
| 2013/0065747 A1 | 3/2013 | Danielson et al. |
| 2013/0237401 A1 | 9/2013 | Kawaguchi et al. |
| 2014/0049708 A1 | 2/2014 | Murata et al. |
| 2014/0243186 A1 | 8/2014 | Danielson et al. |
| 2015/0045201 A1 | 2/2015 | Tokunaga et al. |

FOREIGN PATENT DOCUMENTS

| | | |
|---|---|---|
| EP | 2 639 205 A1 | 9/2013 |
| JP | 10-324526 | 12/1998 |
| JP | 2004-299947 | 10/2004 |
| JP | 2007-039324 | 2/2007 |
| JP | 2009-525942 | 7/2009 |
| JP | 2012-184146 | 9/2012 |
| JP | 2012-236759 | 12/2012 |
| JP | 5737285 B2 * | 6/2015 |
| WO | WO 2011/132785 A1 | 10/2011 |
| WO | WO 2012/133467 A1 | 10/2012 |
| WO | WO 2013/161903 A1 | 10/2013 |

OTHER PUBLICATIONS

International Search Report dated Jan. 30, 2018 in PCT/JP2017/039038 filed on Oct. 30, 2017 (with English Translation).
Written Opinion dated Jan. 30, 2018 in PCT/JP2017/039038 filed on Oct. 30, 2017.

* cited by examiner

Primary Examiner — Elizabeth A. Bolden
(74) Attorney, Agent, or Firm — Oblon, McClelland, Maier & Neustadt, L.L.P.

(57) ABSTRACT

The present invention relates to an alkali-free glass and a method for producing the same. More specifically, the present invention relates to an alkali-free glass suitable as a glass for substrates of various displays such as liquid crystal display, and a method for producing the same. According to the present invention, an alkali-free glass suitable as a glass for display substrates, in which inclusion of bubbles is greatly reduced by virtue of containing a refining agent and suppressing the stirring reboil, is obtained.

20 Claims, No Drawings

ALKALI-FREE GLASS AND METHOD FOR PRODUCING THE SAME

TECHNICAL FIELD

The present invention relates to an alkali-free glass and a method for producing the same. More specifically, the present invention relates to an alkali-free glass suitable as a glass for substrates of various displays such as liquid crystal display, and a method for producing the same.

BACKGROUND ART

Conventionally, a substrate glass for various displays, particularly, a substrate glass on which surface a metal or oxide thin film is formed, has been required to have the following characteristics:

(1) being substantially free of alkali metal ions, because when an alkali metal oxide is contained, alkali metal ions diffuse in the thin film to deteriorate film characteristics;

(2) having a high strain point so that deformation of a glass and shrinkage (thermal shrinkage) due to structure stabilization of the glass can be minimized when exposed to high temperature in a thin film formation step;

(3) having a low specific gravity for weight reduction, and being thin and flat;

(4) having sufficient chemical durability to various chemicals used in semiconductor formation, in particular, having durability to buffered hydrofluoric acid (hydrofluoric acid+ammonium fluoride; BHF) for etching $SiO_x$ or $SiN_x$, a chemical solution containing hydrochloric acid used for etching of ITO, various acids (e.g., nitric acid, sulfuric acid) used for etching of a metal electrode, and an alkali of a resist removing liquid; and (5) having no defect (bubbles, striae, inclusions, pits, flaws, etc.) in the inside and on the surface.

In a glass for substrates of displays, it is strictly required in particular to not contain bubbles, that is, to suppress air bubble generation in the production process or prevent generated air bubbles from remaining in a final product. As the refining agent added to a glass raw material of an alkali-free glass so as to remove bubbles, $SnO_2$, F, Cl, $SO_3$, etc. have been heretofore used.

$SnO_2$ causes bubbles to grow by releasing $O_2$ at a high temperature such as 1,500° C. or more and in turn encourages bubbles to float and burst at the melt surface; F and Cl allow the bubbles to expand in a reduced pressure state; and $SO_3$ causes bubbles to grow by releasing $SO_2$ and $O_2$ in a melting oven.

Patent Document 1 describes a technique of using, as the refining agent of an alkali-free glass, any one or more of $Sb_2O_3$, $SO_3$, $Fe_2O_3$ and $SnO_2$ in combination with any one or more of F and Cl. Patent Document 2 describes that when $SnO_2$ is used as the refining agent of an alkali-free glass, among others, S (sulfur) component is likely to remain as bubbles and therefore, it is preferable not to add S (sulfur) component. Patent Document 3 describes that when $SnO_2$ is used as the refining agent of an alkali-free glass, if the amount of S (sulfur) charged is large, bubbles are rather increased due to re-foaming.

BACKGROUND ART DOCUMENT

Patent Document

Patent Document 1: JP-A-10-324526
Patent Document 2: WO 2012/133467
Patent Document 3: JP-A-2004-299947

SUMMARY OF THE INVENTION

Problems that the Invention is to Solve

In the production of an alkali-free glass, in order to homogenize a mixture of raw materials melted or equalize the concentration gradient generated within a melt (molten glass) at the time of vacuum degassing, the melt is stirred with a stirrer. A negative pressure produced by stirring may cause a reduction in the solubility of S (sulfur) contained in an oversaturated state and allow S to escape as gas (bubbles). In addition, basis materials differing in the S content or the valence of S are mixed by the stirring, as a result, S may turn into gas (bubbles) in the melt. This phenomenon is referred to as stirring reboil.

The embodiments of the present invention aim at providing an alkali-free glass containing sulfur but nevertheless being less likely to cause stirring reboil, and a method for producing the same.

Means for Solving the Problems

The present inventors have found a method for verifying the $S^{2-}$ content during stirring at the time of glass production and with respect to the $SO_3$ content and the $S^{2-}$ content, found conditions under which the stirring reboil is significantly suppressed.

The present invention includes the following embodiments.

[1] An alkali-free glass having a strain point of 680° C. or more, an average thermal expansion coefficient at from 50 to 350° C. of from $30 \times 10^{-7}$ to $45 \times 10^{-7}$/° C., a temperature $T_2$ at which a glass viscosity reaches $10^2$ dPa·s of 1,730° C. or less, a temperature $T_4$ at which a glass viscosity reaches $10^4$ dPa·s of 1,350° C. or less, and a Young's modulus of 80 GPa or more, and including, in terms of wt % on the basis of oxides, $SiO_2$: from 54 to 66%,
$Al_2O_3$: from 10 to 25%,
$B_2O_3$: from 0 to 5%,
MgO: from 0 to 10%,
CaO: from 0 to 15%,
SrO: from 0 to 10%,
BaO: from 0 to 10%, and
$SnO_2$: from 0.05 to 1%, provided that MgO+CaO+SrO+BaO is from 8 to 24%, in which the alkali-free glass has a total sulfur content in terms of $SO_3$ of from 0.5 to 25 ppm by weight, and a $S^{2-}$ content measured after cooling to 600° C. or less within 1 minute from a state of being melted at 1,500 to 1,800° C. of 3 ppm by weight or less.

[2] The alkali-free glass according to [1], in which:

the strain point is 690° C. or more;

the average thermal expansion coefficient is from $35 \times 10^{-7}$ to $43 \times 10^{-7}$/° C.;

the temperature $T_2$ is 1,700° C. or less;

the alkali-free glass includes, in terms of wt % on the basis of oxides, $SiO_2$: from 57 to 63%,
$Al_2O_3$: from 18 to 22%,
$B_2O_3$: from 1 to 4%,
MgO: from 0 to 7%,
CaO: from 3 to 10%, SrO: from 0 to 6%,
BaO: from 2 to 8%, and
SnO$_2$: from 0.1 to 0.5%,
provided that MgO+CaO+SrO+BaO is from 12 to 20%;
the total sulfur content is from 0.5 to 20 ppm by weight; and
the S$^{2-}$ content is 2.5 ppm by weight or less.

[$^3$] A method for producing an alkali-free glass, the method including, in the following order:

a step (1) of preparing a glass raw material so as to have a glass composition including, in terms of wt % on the basis of oxides,
SiO$_2$: from 54 to 66%,
Al$_2$O$_3$: from 10 to 25%,
B$_2$O$_3$: from 0 to 10%,
MgO: from 0 to 10%,
CaO: from 0 to 15%,
SrO: from 0 to 10%,
BaO: from 0 to 10%, and
SnO$_2$: from 0.05 to 1%,
provided that MgO+CaO+SrO+BaO is from 8 to 24%, and
having a total sulfur content in terms of SO$_3$ of from 1 to 25 ppm by weight;
a step (2) of melting the glass raw material to obtain a molten glass;
a step (3) of stirring the molten glass; and
a step (4) of forming the molten glass to obtain an alkali-free glass sheet,
in which the molten glass during stirring in the step (3) has a S$^{2-}$ content of 3 ppm by weight or less.

[4] The method for producing an alkali-free glass according to [3], in which:
the glass composition in the step (1) includes, in terms of wt % on the basis of oxides,
SiO$_2$: from 57 to 63%,
Al$_2$O$_3$: from 18 to 22%,
B$_2$O$_3$: from 1 to 9%,
MgO: from 0 to 7%,
CaO: from 3 to 10%,
SrO: from 0 to 6%,
BaO: from 2 to 8%, and
SnO$_2$: from 0.1 to 0.5%,
provided that MgO+CaO+SrO+BaO is from 12 to 20%; and
the total sulfur content is from 2 to 20 ppm by weight.

Advantage of the Invention

According to the embodiments of the present invention, an alkali-free glass suitable as a glass for display substrates, in which inclusion of bubbles is greatly reduced by virtue of containing a refining agent and suppressing the stirring reboil, is obtained.

MODE FOR CARRYING OUT THE INVENTION

The alkali-free glass according to an embodiment of the present invention has a characteristic configuration in which the total sulfur content in terms of SO$_3$ is from 0.5 to 25 ppm by weight and the S$^{2-}$ content measured after cooling to 600° C. or less within 1 minute from a state of being remelted at 1,500 to 1,800° C. is 3 ppm by weight or less. The technical meaning of the above-described characteristic configuration is described below.

In the production of an alkali-free glass, when SO$_3$ is added as a refining agent so as to remove bubbles, the addition leads to an increase of the S content in the glass. On the other hand, from the viewpoint of suppressing generation of stirring reboil bubbles due to an inability of S to be present in a molten state, the increase of the S content is rather unfavorable.

S can be present in a plurality of states with different oxidation numbers, and it has been found that S$^{2-}$ having a low oxidation number becomes reboil bubbles in the stirring reboil. Accordingly, for suppressing stirring reboil, it is considered better to lower the S-Redox during stirring, thereby decreasing the S$^{2-}$ content.

The "total sulfur" content in the glass composition disclosed in the present description is, irrespective of the form of actual existence, converted to the content in terms of SO$_3$ based on a detected intensity of S-Kα by conducting standard X-ray fluorescence analysis. The term "S-Redox" means the ratio of S$^{2-}$ content in terms of SO$_3$ relative to the total sulfur amount in terms of SO$_3$.

In general, it is known that the valence of S becomes −2 or +6 in glass, and the average valence of S and the S-Redox can be determined from a chemical shift in an X-ray fluorescence spectrum of S-Kα. Accordingly, the S$^{2-}$ content can be determined as an "S$^{2-}$ content in terms of SO$_3$" from the product of "S-Redox" and "total sulfur content in terms of SO$_3$".

On the other hand, SnO$_2$ referred to as the refining agent above acts also as an oxidizing agent, and it is therefore believed that an oxidation effect due to addition of SnO$_2$ enables suppressing generation of bubbles (S$^{2-}$) during stirring and improving the problem of stirring reboil.

However, when SnO$_2$ and S are present together, S is reduced in the temperature drop process and therefore, it has conventionally been difficult to verify the actual S-Redox during stirring or the actual S$^{2-}$ content during stirring. More specifically, during stirring at high temperature, as reduction of Sn itself and generation of O$_2$ represented by a reaction formula:

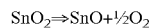
$$SnO_2 \Rightarrow SnO + \tfrac{1}{2}O_2$$

proceed, the equilibrium regarding S:

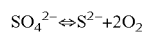
$$SO_4^{2-} \Leftrightarrow S^{2-} + 2O_2$$

is shifted to the left and consequently, generation of S$^{2-}$ is suppressed, but in the subsequent temperature drop process, conversely, the equilibrium regarding S shifts to right as follows:

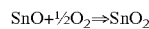
$$SnO + \tfrac{1}{2}O_2 \Rightarrow SnO_2$$

and generation of S$^{2-}$ is promoted. As a result, even when S-Redox of the finished product is measured, it differs from S-Redox during stirring.

Accordingly, in the case of using a SnO$_2$ refining agent in an alkali-free glass, it has been conventionally difficult to ascertain an optimal S content and the range of S-Redox or S$^{2-}$ content from the viewpoint of suppressing stirring reboil while achieving a refining action.

The present inventors have found that when an alkali-free glass containing SnO$_2$ and SO$_3$ is melted and after reaching a temperature at which the melt (molten glass) is stirred in the production process of an alkali-free glass, the glass is, at the time of production of a glass product, cooled in a specific rapid cooling process different from a slow cooling process usually performed after the forming of a sheet glass, the S-Redox can be prevented from a rise associated with a temperature drop, and the S-Redox or S$^{2-}$ content corresponding to that during stirring at the time of production can be more exactly reproduced. Consequently, the range of a rise in the S-Redox due to inclusion of $SnO_2$ can be predicted. Based on these findings, regarding the $SO_3$ content and $S^{2-}$ content in an alkali-free glass containing $SnO_2$ and $SO_3$ as well as in the production thereof, the present inventors have discovered conditions under which the stirring reboil is significantly suppressed, and have accomplished the present invention.

In the present invention, the "alkali-free" glass means a glass substantially free of an alkali metal oxide such as $Na_2O$, $K_2O$ and $Li_2O$. The "substantially free of" as used herein means that an alkali metal oxide is not contained except for being unavoidably contained as an impurity, etc. In the embodiments of the present invention, the amount of an alkali metal that is unavoidably contained is at most about 0.1 mol %.

The content on the basis of oxides of each component in an alkali-free glass according to an embodiment of the present invention is described below. In the following, unless otherwise indicated, % means mass % and has the same meaning as wt %. In addition, ppm means ppm by mass and has the same meaning as ppm by weight. The "to" indicating a numerical range means to include numerical values described before and after that as a lower limit value and an upper limit value, respectively.

In the alkali-free glass according to an embodiment of the present invention, if the content of $SiO_2$ is less than 54%, the stain point does not rise sufficiently, the thermal expansion coefficient is increased, and the density gets higher. For this reason, the content thereof is 54% or more, preferably 55% or more, more preferably 56% or more, particularly preferably 57% or more, and most preferably 58% or more.

If the content of $SiO_2$ exceeds 66%, the meltability is reduced, the temperature $T_2$ at which the glass viscosity reaches $10^2$ dPa·s or the temperature $T_4$ at which the glass viscosity reaches $10^4$ dPa·s rises, and the devitrification temperature gets higher. Accordingly, the content thereof is 66% or less, preferably 65% or less, more preferably 64% or less, particularly preferably 63% or less, and most preferably 62% or less.

$Al_2O_3$ inhibits phase separation property of the glass, reduces the thermal expansion coefficient, and raises the strain point, but if the content thereof is less than 10%, these effects are not manifested, and the content of another component that increases expansion is increased, resulting in large thermal expansion. For this reason, the content of $Al_2O_3$ is 10% or more, preferably 12% or more, more preferably 14% or more, further preferably 15% or more, particularly preferably 16% or more, and most preferably 18% or more.

If the content of $Al_2O_3$ exceeds 25%, the meltability of the glass may be deteriorated, or the devitrification temperature may rise. Accordingly, the content thereof is 25% or less, preferably 24% or less, more preferably 23% or less, particularly preferably 22% or less, and most preferably 21% or less.

$B_2O_3$ is not essential but enhances the melting reactivity of the glass, lowers the devitrification temperature, and improves BHF resistance. If the content thereof is less than 0.2%, the effects above are not sufficiently manifested. For this reason, the content of $B_2O_3$ is preferably 0.2% or more, more preferably 0.5% or more, further preferably 1% or more, and particularly preferably 1.5% or more. The content of $B_2O_3$ is at most 10% and is preferably 9% or less. Furthermore, if the content thereof exceeds 5%, the strain point lowers, and the Young's modulus is reduced. Accordingly, the content of $B_2O_3$ is preferably 5% or less, more preferably 4.5% or less, further preferably 4% or less, particularly preferably 3.5% or less, and most preferably 3% or less.

MgO is not essential but has a characteristic of, among alkaline earth metals, raising the Young's modulus while maintaining the density low without increasing expansion and therefore, can be contained so as to enhance the meltability. The content of MgO is preferably 1% or more, more preferably 2% or more, and further preferably 3% or more. However, if the content thereof is too large, the devitrification temperature rises. For this reason, the content of MgO is 10% or less, preferably 8.5% or less, more preferably 7% or less, and further preferably 6% or less.

CaO is not essential but has a characteristic of, among alkaline earth metals, next to MgO, raising the Young's modulus while maintaining the density low without increasing expansion as well as a characteristic of enhancing also the meltability and therefore, can be contained. However, if the content thereof is too large, the devitrification temperature may rise or a large amount of phosphorus that is an impurity in limestone ($CaCO_3$) serving as a CaO raw material may be mixed. For this reason, the content of CaO is 15% or less, preferably 12% or less, more preferably 10% or less. In order to bring out the characteristics described above, the content of CaO is preferably 3% or more.

SrO is not essential but may be contained so as to enhance the meltability without raising the devitrification temperature of the glass. However, if the content thereof is too large, the expansion coefficient may increase. For this reason, the content of SrO is 10% or less, preferably 8% or less, more preferably 6% or less.

BaO is not essential but may be contained so as to enhance the meltability. For example, BaO may be added in an amount of 2% or more. However, if the content thereof is too large, the expansion and density of the glass are excessively increased. For this reason, the content of BaO is 10% or less. The content of BaO is preferably 8% or less, more preferably 5% or less, further preferably 3% or less, and it is more preferable to be substantially free of BaO. The "substantially free of" means to not contain the component other than as an unavoidable impurity.

$ZrO_2$ may be contained in an amount of up to 5% for lowering the glass melting temperature or promoting crystal deposition during firing. If the content thereof exceeds 5%, the glass may become unstable, or the relative dielectric constant $\varepsilon$ of the glass may become large. In an alkali-free glass according to an embodiment of the present invention, the content of $ZrO_2$ is preferably 3% or less, more preferably 1% or less, further preferably 0.5% or less, and it is particularly preferable to be substantially free of $ZrO_2$.

The total content of MgO, CaO, SrO and BaO, i.e., MgO+CaO+SrO+BaO, is 8% or more, because if it is less than 8%, there is a tendency that the photoelastic constant becomes large and the meltability is reduced. It is preferable to contain these components in a large amount for the purpose of reducing the photoelectric constant, and therefore, MgO+CaO+SrO+BaO is preferably 10% or more, more preferably 12% or more, and further preferably 16% or more. If MgO+CaO+SrO+BaO exceeds 24%, the average thermal expansion coefficient cannot be reduced, and the strain point may become low. For this reason, MgO+CaO+SrO+BaO is 24% or less, preferably 22% or less, more preferably 20% or less.

In the case of employing float forming as the forming method, it is preferred that the total content of MgO, CaO, SrO and BaO satisfies the range described above, more preferably satisfies the range of 12 to 24%, and the contents of respective components satisfy all of the following conditions, because the Young's modulus and specific modulus can be increased without raising the devitrification temperature and the viscosities, particularly $T_4$, of the glass can be reduced.

MgO/(MgO+CaO+SrO+BaO) is 0.10 or more, preferably 0.15 or more, more preferably 0.20 or more.

CaO/(MgO+CaO+SrO+BaO) is 0.50 or less, preferably 0.45 or less, more preferably 0.40 or less.

SrO/(MgO+CaO+SrO+BaO) is 0.70 or less, preferably 0.60 or less, more preferably 0.50 or less.

BaO/(MgO+CaO+SrO+BaO) is 0.50 or less, preferably 0.45 or less, more preferably 0.40 or less.

In the case of employing fusion forming as the forming method, it is preferred that the total content of MgO, CaO, SrO and BaO satisfies the range described above, more preferably satisfies the range of 8 to 22%, and all of the following conditions are satisfied.

MgO/(MgO+CaO+SrO+BaO) is 0.25 or less, preferably 0.20 or less, more preferably 0.15 or less.

CaO/(MgO+CaO+SrO+BaO) is 0.20 or more, preferably 0.30 or more, more preferably 0.40 or more.

SrO/(MgO+CaO+SrO+BaO) is 0.50 or less, preferably 0.45 or less, more preferably 0.40 or less.

BaO/(MgO+CaO+SrO+BaO) is 0.70 or less, preferably 0.50 or less, more preferably 0.40 or less.

In addition to respective components described above, the alkali-free glass according to an embodiment of the present invention may contain one or more of ZnO, $Fe_2O_3$, F, and Cl, and the total amount thereof is preferably 3% or less, more preferably 2% or less, further preferably 1% or less, and particularly preferably 0.5% or less.

On the other hand, in order to not deteriorate the properties of, for example, a metal or oxide thin film provided on a glass sheet surface, it is preferable that the alkali-free glass according to an embodiment of the present invention is substantially free of $P_2O_5$. Furthermore, in order to facilitate recycle of the glass, it is preferable that the alkali-free glass according to an embodiment of the present invention is substantially free of PbO, $As_2O_3$ and $Sb_2O_3$.

The alkali-free glass according to an embodiment of the present invention contains $SnO_2$ as a refining agent. In order to obtain the effect as a refining agent, the content of Sn in the alkali-free glass according to an embodiment of the present invention is, in terms of $SnO_2$, 0.05% or more, preferably 0.1% or more, more preferably 0.15% or more, and further preferably 0.2% or more. If $SnO_2$ is contained excessively, coloring or devitrification of the glass may be induced while the refining effect is saturated, and in addition, control of S-Redox may become difficult. The content of $SnO_2$ in the alkali-free glass according to an embodiment of the present invention is 1% or less, preferably 0.7% or less, more preferably 0.5% or less, further preferably 0.4% or less, and particularly preferably 0.3% or less. The content of $SnO_2$ as used herein is the amount of total tin in terms of $SnO_2$, remaining in the glass melt.

The alkali-free glass according to an embodiment of the present invention may further contain $SO_3$, and the content thereof is 25 ppm by mass or less. The content of $SO_3$ as used herein is the amount of total sulfur determined by converting S remaining in the glass into $SO_3$ and is sometimes referred to as the total sulfur content in terms of $SO_3$. If the content of $SO_3$ exceeds 25 ppm by mass, it becomes difficult to control the later-described $S^{2-}$ content. The content of $SO_3$ in the alkali-free glass according to an embodiment of the present invention is preferably 20 ppm by mass or less, more preferably 15 ppm by mass or less, further preferably 10 ppm by mass or less, and particularly preferably 9 ppm by mass or less. Since the alkali-free glass according to an embodiment of the present invention can contain $SO_3$, the refining effect of $SO_3$, in addition to $SnO_2$, can be aggressively utilized. In order to obtain the refining effect of $SO_3$, the content of $SO_3$ in the alkali-free glass according to an embodiment of the present invention is at least 0.5 ppm by mass and is preferably 1 ppm by mass or more, more preferably 2 ppm by mass or more, still more preferably 3 ppm by mass or more, further preferably 5 ppm by mass or more, and particularly preferably 8 ppm by mass or more.

The S-Redox and $S^{2-}$ content measured after melting an alkali-free glass in a crucible, etc to obtain a melt at 1,250 to 1,670° C. (corresponding to the temperature when stirring the melt in the production of an alkali-free glass) and cooling the melt to 600° C. or less within 1 minute from a state of being melted at 1,500 to 1,800° C. reflect the S-Redox and $S^{2-}$ content during stirring of the melt in the production process of an alkali-free glass, and in the present description, the values thereof are referred to as S-Redox and $S^{2-}$ content each "corresponding to that during stirring". The temperature of 1,250 to 1,670° C. described above corresponds to the temperature range from temperature $T_{3.5}$ at which the viscosity satisfies log $\eta=10^{3.5}$ [dPa·s] to temperature $T_{2.5}$ at which the viscosity satisfies log $\eta=10^{2.5}$ [dPa·s].

The present inventors have found that in an alkali-free glass containing $SnO_2$ and $SO_3$, stirring reboil is greatly suppressed when the $SO_3$ content and oxidation/reduction (redox) are adjusted to allow the $S^{2-}$ content corresponding to that during stirring to become 3.0 ppm by mass or less.

More specifically, in the alkali-free glass according to an embodiment of the present invention, the $S^{2-}$ content corresponding to that during stirring is 3.0 ppm by mass or less, preferably 2.5 ppm by mass or less, more preferably 2.0 ppm by mass or less, and further preferably 1.5 ppm by mass or less.

Cooling the melt (molten glass) to 600° C. or less within 1 minute from a temperature of 1,500 to 1,800° C. can be achieved usually by allowing the poured melt to cool (rapid cooling) in the air. For example, the melt at 1,500 to 1,800° C. is poured into a carbon mold having a diameter of 40 mm at normal temperature to provide a glass thickness of 10 mm to 20 mm and is allowed to cool in the air, thereby making a glass. A more aggressive cooling operation may be performed using a means known to one skilled in the art so as to obtain a higher cooling rate than mere standing to cool, but a glass sample is likely to be broken at an excessive cooling rate, and with a broken glass sample, measurement of the exact $S^{2-}$ content becomes difficult. Accordingly, it is preferable to keep the cooling rate at a level not causing breakage of the glass.

At the time of cooling, the temperature may differ between surface and inside of the sample but, anyway, a portion cooled to 600° C. or less within 1 minute can be used for the analysis of $S^{2-}$ content.

As known to one skilled in the art, the content of each component (including the $S^{2-}$ content) in a glass sample can be measured by an X-ray fluorescence analyzer. The valence of S in glass is known to be +6 or −2 in most cases. Then, the energy at a peak top of S-Kα is determined by X-ray fluorescence analysis using $SrSO_4$ as a reference sample of +6-valent S and using ZnS as a reference sample of −2-valent S. Subsequently, the peak energy value of an unknown sample is measured to obtain an average valence of S, and the S-Redox can be determined according to the following formula:

S-Redox (%)=([average valence of S]−6)/(−8)×100

Incidentally, the conditions in the step of rapidly cooling a melt of the sample as described above so as to measure the $S^{2-}$ content corresponding to that during stirring are different from the cooling conditions usually used after the forming of a sheet glass (ribbon) in the actual glass production process. Because, in the glass production process, gentle cooling in which the cooling rate is artificially decreased in a slow cooling furnace so as to prevent distortion of a glass sheet, that is, slow cooling, is usually performed. Due to this difference, the S-Redox and $S^{2-}$ content corresponding to those during stirring of the alkali-free glass, which are determined as described in the present description, are usually different from the S-Redox and $S^{2-}$ content in a product state of the alkali-free glass.

In the alkali-free glass according to an embodiment of the present invention, the S-Redox in a product state is preferably 95% or less, more preferably 80% or less, further preferably 60% or less, and particularly preferably 50% or less.

In the alkali-free glass according to an embodiment of the present invention, the stain point is preferably 650° C. or more, more preferably 680° C. or more, and further preferably 690° C. or more. If the strain point is low, deformation of a glass sheet and shrinkage (thermal shrinkage) due to structure stabilization of the glass are likely to occur when the glass sheet is exposed to high temperature in a thin film formation step of a display, etc. The strain point is preferably 750° C. or less, more preferably 740° C. or less, and further preferably 730° C. or less. If the stain point is too high, the temperature of the forming apparatus needs to be raised, and the life of the forming apparatus tends to be reduced.

In the alkali-free glass according to an embodiment of the present invention, from the viewpoint of productivity and thermal shock resistance in the production of a product such as display, the average thermal expansion coefficient at from 50 to 350° C. is preferably $45 \times 10^{-7}$/° C. or less, more preferably $43 \times 10^{-7}$/° C. or less, and further preferably $40 \times 10^{-7}$/° C. or less. On the other hand, the average thermal expansion coefficient at from 50 to 350° C. is preferably $30 \times 10^{-7}$/° C. or more, more preferably $33 \times 10^{-7}$/° C. or more, and further preferably $35 \times 10^{-7}$/° C. or more. For example, in the production of a TFT-side substrate of a flat panel display, a gate metal film such as copper and a gate insulating film such as silicon nitride are sometimes sequentially stacked on an alkali-free glass, and if the thermal expansion coefficient is low, the difference in expansion ratio between the gate insulating film and the glass is too small, as a result, the effect of the gate insulating film to cancel the glass warpage generated by the film formation of the gate metal film is reduced. This may lead to an increase in warpage of the substrate, causing an inconvenience in transportation, or an increase in pattern misregistration during exposure.

In the alkali-free glass according to an embodiment of the present invention, in order to realize weight reduction of a product and increase the specific modulus, the specific gravity is preferably 2.7 g/cm³ or less, more preferably 2.65 g/cm³ or less, and further preferably 2.6 g/cm³ or less. The sheet thickness is preferably 0.7 mm or less.

In the alkali-free glass according to an embodiment of the present invention, the temperature $T_2$ at which the glass viscosity reaches $10^2$ dPa·s is preferably 1,750° C. or less. $T_2$ is more preferably 1,730° C. or less, further preferably 1,700° C. or less, and particularly preferably 1,660° C. or less. If $T_2$ is high, the load on the production apparatus may be increased, because the meltability of the glass is poor and a high temperature is required.

In the alkali-free glass according to an embodiment of the present invention, the temperature $T_{2.5}$ at which the glass viscosity reaches $10^{2.5}$ dPa·s is preferably 1,670° C. or less. $T_{2.5}$ is more preferably 1,630° C. or less, further preferably 1,600° C. or less, and particularly preferably 1,570° C. or less. The temperature $T_3$ at which the glass viscosity reaches $10^3$ dPa·s is preferably 1,570° C. or less. $T_3$ is more preferably 1,530° C. or less, further preferably 1,500° C. or less, and particularly preferably 1,470° C. or less. The temperature $T_{3.5}$ at which the glass viscosity reaches $10^{3.5}$ dPa·s is preferably 1,480° C. or less. $T_{3.5}$ is more preferably 1,440° C. or less, further preferably 1,410° C. or less, and particularly preferably 1,380° C. or less.

If $T_{2.5}$, $T_3$ and $T_{3.5}$ are high, a high temperature is required and therefore, the load on the stirring apparatus may be increased.

Furthermore, the temperature $T_4$ at which the glass viscosity reaches $10^4$ dPa·s is preferably 1,370° C. or less. $T_4$ is more preferably 1,350° C. or less, further preferably 1,320° C. or less, and particularly preferably 1,300° C. or less. If $T_4$ is high, the life of a casing structure or heater of a float bath used for float forming may be extremely shortened.

In the alkali-free glass according to an embodiment of the present invention, the Young's modulus is preferably 77 GPa or more, and more preferably 80 GPa or more. A high Young's modulus leads to an increase in the specific modulus and enhancement of fracture toughness of the glass and therefore, the glass is suitable as a substrate glass for various displays or a substrate glass for a photomask, which requires size enlargement and thinning of a glass sheet.

The alkali-free glass according to an embodiment of the present invention can be produced by appropriately combining production techniques known to one skilled in the art. For example, raw materials of respective components described above are first mixed so as to obtain the above-described predetermined composition, the resulting mixture is continuously charged into a melting furnace and melted by heating at 1,500 to 1,800° C. to obtain a molten glass, the molten glass is stirred at a temperature $T_3$ at which the viscosity satisfies log η=$10^3$ [dPa·s], and then formed into a glass ribbon having a predetermined thickness in a forming apparatus, and the glass ribbon is slowly cooled and thereafter, cut to obtain an alkali-free glass sheet. Before the forming, the molten glass may be subjected to a general degassing step such as vacuum degassing. After the degassing step, stirring of the melt may be performed. The forming is preferably performed by a float process or a fusion process, etc.

More specifically, in another aspect, the present invention provides a method for producing an alkali-free glass according to an embodiment of the present invention, and the method includes at least a step (1) of preparing a glass raw material so as to have a desired glass composition, a step (2) of melting the glass raw material to obtain a molten glass, a step (3) of stirring the molten glass, and a step (4) of forming the molten glass to obtain an alkali-free glass sheet. The stirring step (3) may be conducted at $T_{2.5}$ to $T_{3.5}$. Here, $T_{2.5}$ is a temperature at which the viscosity satisfies log η=$10^{2.5}$ [dPa·s], and $T_{3.5}$ is a temperature at which the viscosity satisfies log η=$10^{3.5}$ [dPa·s].

In the step (1), the glass raw material is preferably prepared so as to include, in terms of wt % on the basis of oxides, $SiO_2$: from 54 to 66%,
$Al_2O_3$: from 10 to 25%,
$B_2O_3$: from 0 to 10%,
MgO: from 0 to 10%,
CaO: from 0 to 15%,
SrO: from 0 to 10%,
BaO: from 0 to 10%, and
$SnO_2$: from 0.05 to 1%,
provided that MgO+CaO+SrO+BaO is from 8 to 24%, and
so as to have the total sulfur content in terms of $SO_3$ of from 1 to 25 ppm by weight.

It is more preferable to prepare the glass raw material so as to include, in terms of wt % on the basis of oxides, $SiO_2$: from 57 to 63%,
$Al_2O_3$: from 18 to 22%,
$B_2O_3$: from 1 to 9%,
MgO: from 0 to 7%,
CaO: from 3 to 10%,
SrO: from 0 to 6%,
BaO: from 2 to 8%, and
$SnO_2$: from 0.1 to 0.5%,
provided that MgO+CaO+SrO+BaO is from 12 to 20%, and
so as to have the total sulfur content of from 2 to 20 ppm by weight.

In the production method of an alkali-free glass according to an embodiment of the present invention, the $S^{2-}$ content (in the molten glass) during stirring in the step (3) is 3 ppm by mass or less. The $S^{2-}$ content during stirring is preferably 2.5 ppm by mass or less, more preferably 2.0 ppm by mass or less, and further preferably 1.5 ppm by mass or less.

In the present description, the "$S^{2-}$ content during stirring" is expressed as the $S^{2-}$ content measured after remelting an alkali-free glass produced through the production process, and cooling the melt to 600° C. or less within 1 minute from a temperature of 1,500 to 1,800° C.

Cooling the melt (molten glass) to 600° C. or less within 1 minute from a temperature of 1,500 to 1,800° C. can be achieved usually by allowing the poured melt to cool in the air and, for example, can be achieved by pouring the melt into a mold having a diameter of 40 mm to provide a glass thickness of 10 mm to 20 mm and allowing it to cool in the air. A more aggressive cooling operation may be performed using a means known to one skilled in the art so as to obtain a higher cooling rate than mere standing to cool, but a glass sample is likely to be broken at an excessive cooling rate, and with a broken glass sample, measurement of the exact $S^{2-}$ content becomes difficult. Accordingly, it is preferable to keep the cooling rate at a level not causing breakage of the glass. At the time of cooling, the temperature may differ between surface and inside of the sample but, anyway, a portion cooled to 600° C. or less within 1 minute can be used for the analysis of $S^{2-}$ content.

The $S^{2-}$ content during stirring may be controlled to a low level by adjusting the total sulfur content to fall within the range specified in the present invention and taking a measure to prevent a rise in the S-Redox, for example, increasing the relative amount of an oxidizing agent, suppressing the injection of a reducing agent such as coke, not excessively raising the melting temperature (for example, keeping it at 1,700° C. or less), reducing the oxygen partial pressure, or decreasing the ratio of a hydroxide of an alkaline earth metal in raw materials so as to reduce the β-OH. It is within the ordinary skill of one skilled in the art to appropriately select these measures and verify the $S^{2-}$ content during stirring in accordance with the disclosure of the present description.

EXAMPLES

The embodiments of the present invention are described in greater detail below by referring to Examples, but the present invention is not limited to these Examples.

Each of a plurality of alkali-free glasses containing $SnO_2$ and $SO_3$ was melted for 4 hours at a temperature of 1,650° C. by using a platinum crucible. After the melting, the melt was poured on a carbon plate and slowly cooled at a cooling rate of 1° C./min or allowed to cool in the air (rapidly cooled; more specifically, the molten glass was cooled to 600° C. or less within 1 minute from a temperature of 1,500 to 1,800° C.), thereby being cooled to room temperature, to obtain a plate-like glass sheet. As the S-Redox analysis part, a surface put into contact with the carbon plate and thereby rapidly cooled was used.

The analysis surface was mirror-polished, subjected to ultrasonic cleaning in ethanol, dried by a drier, and wrapped in aluminum foil so as to prevent contamination of the surface. The aluminum foil was removed immediately before the S-Redox analysis by X-ray fluorescence.

In one alkali-free glass, S-Redox measured after slow cooling exceeded 85%, whereas S-Redox measured after rapid cooling was about 15%. In another alkali-free glass, S-Redox measured after slow cooling was from 65 to 97%, whereas S-Redox measured after rapid cooling was from 15 to 20%. In this way, a rapidly cooled alkali-free glass maintained a low S-Redox while a slowly cooled alkali-free glass had an excessively high S-Redox, and it is understood that under rapid cooling conditions, reduction of S associated with a temperature drop was suppressed in the presence of $SnO_2$. Incidentally, in an alkali-free glass having a composition free of $SnO_2$, irrespective of cooling conditions, a significantly high S-Redox as described above was not observed.

Next, each alkali-free glass sample having the composition shown in Table 1, in which the $S^{2-}$ content corresponding to that during stirring (measured via remelting after the production) is as shown in Table 1, was produced. In Table 1, the numerical value in parenthesis is a calculated value. At the time of production, stirring of a melt obtained by melting raw materials was performed. More specifically, a platinum crucible having an inside diameter of 85 mm and a height of 140 mm was filled to a depth of 100 mm with the melt, a stirrer having a blade diameter of 45 mm and a blade height of 25 mm was immersed 50 mm in the center of the crucible, and after the production of a glass sample stirred at 30 rpm, the number of bubbles per volume was counted.

Measurement methods of respective physical properties are described below.

(Average Thermal Expansion Coefficient)

This was measured using a differential thermal dilatometer (TMA) according to the method specified in JIS R3102 (1995) over a measurement temperature range of 50 to 350° C. and expressed in the unit of $10^{-7}$/° C.

(Strain Point)

This was measured according to the method specified in JIS R3103-2 (2001).

(Glass Transition Point Tg)

This was measured using TMA according to the method specified in JIS R3103-3 (2001).

(Specific Gravity)

This was measured using about 20 g of a glass block containing no bubbles by the Archimedes' method according to the method specified in JIS Z 8807 (2012).

(Young's Modulus)

This was measured on a glass having a thickness of 0.5 mm to 10 mm by the ultrasonic pulse method according to the method specified in JIS Z 2280 (1993).

($T_2$ to $T_4$)

The viscosity was measured with a rotational viscometer according to the method specified in ASTM C 965-96 (2012).

As apparent from Table 1, in Examples 6 to 10 where the $S^{2-}$ content corresponding to that during stirring was set to exceed 3 ppm by mass by raising the S-Redox and/or increasing the absolute amount of S, vigorous bubble generation due to stirring was observed, whereas in Examples 1 to 5 where the $S^{2-}$ content corresponding to that during stirring was kept to 3 ppm by mass or less, bubbles were less generated.

INDUSTRIAL APPLICABILITY

The alkali-free glass according to an embodiment of the present invention is suitable as a high-quality glass for displays, etc. in which no inclusion of bubbles is strictly required.

The invention claimed is:

1. An alkali-free glass having a strain point of 680° C. or more, an average thermal expansion coefficient at from 50 to 350° C. of from $30 \times 10^{-7}$ to $45 \times 10^{-7}$/° C., a temperature $T_2$ at which a glass viscosity reaches $10^2$ dPa·s of 1,730° C. or less, a temperature $T_4$ at which a glass viscosity reaches $10^4$ dPa·s of 1,350° C. or less, and a Young's modulus of 80 GPa or more, comprising, in terms of wt % on the basis of oxides, $SiO_2$: from 54 to 66%,
$Al_2O_3$: from 10 to 25%,
$B_2O_3$: from 0 to 5%,
MgO: from 0 to 10%,
CaO: from 0 to 15%,

TABLE 1

|  | Example 1 | Example 2 | Example 3 | Example 4 | Example 5 | Example 6 | Example 7 | Example 8 | Example 9 | Example 10 |
|---|---|---|---|---|---|---|---|---|---|---|
| $SiO_2$ [mass %] | 61.2 | 61.0 | 59.0 | 59.3 | 59.3 | 61.2 | 61.0 | 59.0 | 59.3 | 59.3 |
| $Al_2O_3$ [mass %] | 19.8 | 20.0 | 19.0 | 16.8 | 16.8 | 19.8 | 20.0 | 19.0 | 16.8 | 16.8 |
| $B_2O_3$ [mass %] | 1.5 | 2.5 | 6.0 | 8.0 | 8.0 | 1.5 | 2.5 | 6.0 | 8.0 | 8.0 |
| MgO [mass %] | 5.6 | 2.0 | 3.0 | 3.4 | 3.4 | 5.6 | 2.0 | 3.0 | 3.4 | 3.4 |
| CaO [mass %] | 4.6 | 4.5 | 7.0 | 4.2 | 4.2 | 4.6 | 4.5 | 7.0 | 4.2 | 4.2 |
| SrO [mass %] | 7.0 | 2.0 | 1.0 | 7.8 | 7.8 | 7.0 | 2.0 | 1.0 | 7.8 | 7.8 |
| BaO [mass %] | 0 | 8.0 | 5.0 | 0 | 0 | 0 | 8.0 | 5.0 | 0 | 0 |
| $SnO_2$ [mass %] | 0.1 | 0.2 | 0.2 | 0.2 | 0.1 | 0.1 | 0.2 | 0.2 | 0.2 | 0.2 |
| Total sulfur (in terms of $SO_3$) [ppm] | 16.0 | 9.0 | 10.0 | 12.0 | 10.0 | 21.0 | 22.0 | 30.0 | 25.0 | 25.0 |
| S-Redox during stirring [%] | (15) | (20) | (20) | 13 | (15) | (15) | (20) | (20) | 31 | 18 |
| $S^{2-}$ concentration (in terms of $SO_3$) during stirring [ppm] | (2.4) | (1.8) | (2.0) | 1.6 | (1.5) | (3.2) | (4.4) | (6.0) | 7.8 | 4.5 |
| Number of stirring reboil bubbles [bubbles/cm³] | 5 | 10 | 6 | 4 | 7 | 51 | 69 | 308 | 592 | 432 |
| MgO + CaO + SrO + BaO | 17.1 | 16.5 | 16.0 | 15.5 | 15.5 | 17.1 | 16.5 | 16.0 | 15.5 | 15.5 |
| MgO/(MgO + CaO + SrO + BaO) | 0.32 | 0.12 | 0.19 | 0.22 | 0.22 | 0.32 | 0.12 | 0.19 | 0.22 | 0.22 |
| CaO/(MgO + CaO + SrO + BaO) | 0.27 | 0.27 | 0.44 | 0.27 | 0.27 | 0.27 | 0.27 | 0.44 | 0.27 | 0.27 |
| SrO/(MgO + CaO + SrO + BaO) | 0.41 | 0.12 | 0.06 | 0.50 | 0.50 | 0.41 | 0.12 | 0.06 | 0.50 | 0.50 |
| BaO/(MgO + CaO + SrO + BaO) | 0 | 0.48 | 0.31 | 0 | 0 | 0 | 0.48 | 0.31 | 0 | 0 |
| Average thermal expansion coefficient [$\times 10^{-7}$/° C.] | 39.0 | 37.6 | 37.6 | 39.0 | 39.0 | 39.0 | 37.6 | 37.6 | 39.0 | 39.0 |
| Strain point [° C.] | 730 | 748 | 686 | 665 | 665 | 730 | 748 | 686 | 665 | 665 |
| Glass transition point [° C.] | 786 | (785) | (742) | 715 | 715 | 786 | (785) | (742) | 715 | 715 |
| Specific gravity | 2.59 | 2.59 | 2.50 | 2.51 | 2.51 | 2.59 | 2.59 | 2.50 | 2.51 | 2.51 |
| Young's modulus [GPa] | 87 | 82 | 79 | 77 | 77 | 87 | 82 | 79 | 77 | 77 |
| $T_2$ [° C.] | 1654 | 1753 | 1640 | 1645 | 1645 | 1654 | 1753 | 1640 | 1645 | 1645 |
| $T_{2.5}$ [° C.] | 1541 | 1637 | 1528 | 1530 | 1530 | 1541 | 1637 | 1528 | 1530 | 1530 |
| $T_3$ [° C.] | 1447 | 1539 | 1433 | 1432 | 1432 | 1447 | 1539 | 1433 | 1432 | 1432 |
| $T_{3.5}$ [° C.] | 1367 | 1454 | 1352 | 1348 | 1348 | 1367 | 1454 | 1352 | 1348 | 1348 |
| $T_4$ [° C.] | 1298 | 1381 | 1281 | 1275 | 1275 | 1298 | 1381 | 1281 | 1275 | 1275 |

While the invention has been described in detail and with reference to specific embodiments thereof, it will be apparent to one skilled in the art that various changes and modifications can be made therein without departing from the spirit and scope of the invention. This application is based on Japanese Patent Application (Patent Application No. 2016-214840) filed on Nov. 2, 2016, the contents of which are incorporated herein by way of reference.

SrO: from 0 to 10%,

BaO: from 0 to 10%, and $SnO_2$: from 0.05 to 1%, provided that MgO+CaO+SrO+BaO is from 8 to 24%, and having a total sulfur content in terms of $SO_3$ of from 0.5 to 16 ppm by weight, wherein the alkali-free glass is produced by heating raw materials to obtain a molten glass, by stirring the molten glass, and then by cooling the molten glass, and wherein the molten glass is stirred at least at a temperature of 1,500 to 1,800° C., and the molten glass has a $S^{2-}$ content in terms of $SO_3$ of 3 ppm or less by weight during the stirring, where the $S^{2-}$ content is measured after cooling from 1,500 to 1,800° C. to 600° C. or less within 1 minute.

2. The alkali-free glass according to claim 1, wherein:
the strain point is 690° C. or more;
the average thermal expansion coefficient is from $35 \times 10^{-7}$ to $43 \times 10^{-7}/°$ C.;
the temperature $T_2$ is 1,700° C. or less;
the alkali-free glass comprises, in terms of wt % on the basis of oxides,
$SiO_2$: from 57 to 63%,
$Al_2O_3$: from 18 to 22%,
$B_2O_3$: from 1 to 4%,
MgO: from 0 to 7%,
CaO: from 3 to 10%,
SrO: from 0 to 6%,
BaO: from 2 to 8%, and
$SnO_2$: from 0.1 to 0.5%,
provided that MgO+CaO+SrO+BaO is from 12 to 20%;
the total sulfur content in terms of $SO_3$ of the alkali-free glass is from 0.5 to 16 ppm by weight; and
the $S^{2-}$ content in terms of $SO_3$ of the molten glass during the stirring is 2.5 ppm by weight or less.

3. The alkali-free glass according to claim 1, wherein the total sulfur content in terms of $SO_3$ of the alkali-free glass is from 1 to 16 ppm by weight.

4. The alkali-free glass according to claim 1, wherein the total sulfur content in terms of $SO_3$ of the alkali-free glass is from 3 to 16 ppm by weight.

5. The alkali-free glass according to claim 1, wherein the total sulfur content in terms of $SO_3$ of the alkali-free glass is from 8 to 16 ppm by weight.

6. The alkali-free glass according to claim 1, wherein the $S^{2-}$ content in terms of $SO_3$ of the molten glass during the stirring is 2.0 ppm by weight or less.

7. The alkali-free glass according to claim 1, wherein the $S^{2-}$ content in terms of $SO_3$ of the molten glass during the stirring is 1.5 ppm by weight or less.

8. A method for producing an alkali-free glass, the method comprising:
melting a glass raw material to obtain a molten glass, stirring the molten glass; and
cooling the molten glass to form an alkali-free glass,
the alkali-free glass comprising, in terms of wt % on the basis of oxides,
$SiO_2$: from 54 to 66%,
$Al_2O_3$: from 10 to 25%,
$B_2O_3$: from 0 to 10%,
MgO: from 0 to 10%,
CaO: from 0 to 15%,
SrO: from 0 to 10%,
BaO: from 0 to 10%, and
$SnO_2$: from 0.05 to 1%,
provided that MgO+CaO+SrO+BaO is from 8 to 24%, and
having a total sulfur content in terms of $SO_3$ of from 1 to 16 ppm by weight;
wherein the molten glass is stirred at least at a temperature of 1,500 to 1,800° C., and the molten glass has a $S^{2-}$ content in terms of $SO_3$ of 3 ppm or less by weight during the stirring, where the $S^{2-}$ content is measured after cooling from 1,500 to 1,800° C. to 600° C. or less within 1 minute.

9. The method for producing an alkali-free glass according to claim 8, wherein:
the alkali-free glass comprises, in terms of wt % on the basis of oxides,
$SiO_2$: from 57 to 63%,
$Al_2O_3$: from 18 to 22%,
$B_2O_3$: from 1 to 9%,
MgO: from 0 to 7%,
CaO: from 3 to 10%,
SrO: from 0 to 6%,
BaO: from 2 to 8%, and
$SnO_2$: from 0.1 to 0.5%,
provided that MgO+CaO+SrO+BaO is from 12 to 20%; and
the total sulfur content in terms of $SO_3$ of the alkali-free glass is from 2 to 16 ppm by weight.

10. The method for producing an alkali-free glass according to claim 8, wherein the total sulfur content in terms of $SO_3$ of the alkali-free glass is from 3 to 16 ppm by weight.

11. The method for producing an alkali-free glass according to claim 8, wherein the total sulfur content in terms of $SO_3$ of the alkali-free glass is from 5 to 16 ppm by weight.

12. The method for producing an alkali-free glass according to claim 8, wherein the total sulfur content in terms of $SO_3$ of the alkali-free glass is from 8 to 16 ppm by weight.

13. The method for producing an alkali-free glass according to claim 8, wherein the $S^{2-}$ content in terms of $SO_3$ of the molten glass during the stirring is 2.0 ppm by weight or less.

14. The method for producing an alkali-free glass according to claim 8, wherein the $S^{2-}$ content in terms of $SO_3$ of the molten glass during the stirring is 1.5 ppm by weight or less.

15. An alkali-free glass having a strain point of 680° C. or more, an average thermal expansion coefficient at from 50 to 350° C. of from $30 \times 10^{-7}$ to $45 \times 10^{-7}/°$ C., a temperature $T_2$ at which a glass viscosity reaches $10^2$ dPa·s of 1,730° C. or less, a temperature $T_4$ at which a glass viscosity reaches $10^4$ dPa·s of 1,350° C. or less, and a Young's modulus of 80 GPa or more, comprising, in terms of wt % on the basis of oxides,
$SiO_2$: from 54 to 66%,
$Al_2O_3$: from 10 to 25%,
$B_2O_3$: from 0 to 5%,
MgO: from 0 to 10%,
CaO: from 0 to 15%,
SrO: from 0 to 10%,
BaO: from 0 to 10%, and
$SnO_2$: from 0.05 to 1%,
provided that MgO+CaO+SrO+BaO is from 8 to 24%, and
having a total sulfur content in terms of $SO_3$ of from 0.5 to 16 ppm by weight, and a $S^{2-}$ content in terms of $SO_3$ of 3 ppm or less by weight, where the $S^{2-}$ content is measured by heating the alkali-free glass to a temperature range of from 1,500 to 1,800° C. to remelt the alkali-free glass and then by cooling the molten alkali-free glass to 600° C. or less within 1 minute.

16. The alkali-free glass according to claim 15, wherein the total sulfur content in terms of $SO_3$ of the alkali-free glass is from 1 to 16 ppm by weight.

17. The alkali-free glass according to claim 15, wherein the total sulfur content in terms of $SO_3$ of the alkali-free glass is from 3 to 16 ppm by weight.

18. The alkali-free glass according to claim 15, wherein the total sulfur content in terms of $SO_3$ of the alkali-free glass is from 8 to 16 ppm by weight.

19. The alkali-free glass according to claim 15, wherein the $S^{2-}$ content in terms of $SO_3$ of the alkali-free glass is 2.0 ppm by weight or less.

20. The alkali-free glass according to claim 15, wherein the $S^{2-}$ content in terms of $SO_3$ of the alkali-free glass is 1.5 ppm by weight or less.

* * * * *